United States Patent
Dong

(10) Patent No.: US 12,490,326 B2
(45) Date of Patent: Dec. 2, 2025

(54) DATA DOWNLOAD METHOD, APPARATUS, AND TERMINAL DEVICE

(71) Applicant: Honor Device Co., Ltd., Shenzhen (CN)

(72) Inventor: Xiaojuan Dong, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 65 days.

(21) Appl. No.: 17/996,907

(22) PCT Filed: May 13, 2022

(86) PCT No.: PCT/CN2022/092635
§ 371 (c)(1),
(2) Date: Oct. 21, 2022

(87) PCT Pub. No.: WO2022/262492
PCT Pub. Date: Dec. 22, 2022

(65) Prior Publication Data
US 2024/0224357 A1    Jul. 4, 2024

(30) Foreign Application Priority Data

Jun. 16, 2021 (CN) .......................... 202110664770.6

(51) Int. Cl.
*H04W 68/02* (2009.01)
*H04W 76/15* (2018.01)
(Continued)

(52) U.S. Cl.
CPC ............ *H04W 76/15* (2018.02); *H04W 84/12* (2013.01); *H04W 88/06* (2013.01)

(58) Field of Classification Search
None
See application file for complete search history.

(56) References Cited

U.S. PATENT DOCUMENTS 10,849,053 B2   11/2020   Weihua et al.
2018/0278697 A1  9/2018   Cariou et al.
(Continued)

FOREIGN PATENT DOCUMENTS

CN   109803318 A   5/2019
CN   110430592 A   11/2019
(Continued)

*Primary Examiner* — Gary Lafontant
(74) *Attorney, Agent, or Firm* — Slater Matsil, LLP

(57) ABSTRACT

Embodiments of this application provide a data download method and terminal device. The terminal device accesses a first WiFi network through a first WiFi network interface and accesses a second WiFi network through a second WiFi network interface. In the method, after the terminal device detects a data stream from a network side, a dual WiFi capability supported by the terminal device is obtained, the dual WiFi capability including a simultaneous dual band dual band dual concurrent capability and a real simultaneous dual band dual band dual concurrent capability, and the data stream is received through the first WiFi network and/or the second WiFi network based on the dual WiFi capability supported by the terminal device, so that the data stream from the network side can be received through two different WiFi networks.

20 Claims, 5 Drawing Sheets

(51) Int. Cl.
 *H04W 84/12* (2009.01)
 *H04W 88/06* (2009.01)

(56) References Cited

U.S. PATENT DOCUMENTS

| | | |
|---|---|---|
| 2020/0107238 A1 | 4/2020 | Rebecca et al. |
| 2021/0360650 A1 | 11/2021 | Yuan |
| 2022/0159765 A1 | 5/2022 | Li |
| 2022/0159777 A1 | 5/2022 | Jinquan |

FOREIGN PATENT DOCUMENTS

| | | | | |
|---|---|---|---|---|
| CN | 110602806 A | 12/2019 | | |
| CN | 111542133 A | 8/2020 | | |
| CN | 111917434 A | 11/2020 | | |
| CN | 113490291 A | 10/2021 | | |
| WO | 2017024853 A1 | 2/2017 | | |
| WO | 2018108701 A1 | 6/2018 | | |
| WO | 2021031786 | 2/2021 | | |
| WO | 2021036556 A1 | 3/2021 | | |
| WO | WO-2021052128 | * | 3/2021 | ........... H04L 51/224 |
| WO | WO-2021052128 A1 | * | 3/2021 | ........... H04L 51/224 |

* cited by examiner

DATA DOWNLOAD METHOD, APPARATUS, AND TERMINAL DEVICE

CROSS-REFERENCE TO RELATED APPLICATIONS

This application is a National Stage of International Application No. PCT/CN2022/092635, filed on May 13, 2022, which claims priority to Chinese Patent Application No. 202110664770.6, filed on Jun. 16, 2021, both of which are hereby incorporated by reference in their entireties.

TECHNICAL FIELD

Embodiments of this application relate to the technical field of intelligent terminals, and in particular, to a data download method, apparatus, and terminal device.

BACKGROUND

With the widespread and application of terminal devices such as smartphones, the smartphones can support more and more applications and have increasingly powerful functions. The smartphones are developing in a diversified and personalized direction, and have become indispensable electronic products in user life. In addition, to ensure the normal operation of the applications, the stability in network data transmission for the smartphones needs to be guaranteed, so that a faster network and/or a lower network latency can be obtained. Therefore, dual wireless fidelity (wireless fidelity, WiFi) network smartphones came into being.

However, in the related art, only when a transmission rate of a single WiFi network is low, a smartphone may enable dual WiFi, to access two different WiFi networks to transmit network data simultaneously. Even in this way, a high latency and/or a low network speed still occur and the user experience is poor.

SUMMARY

Embodiments of this application provide a data download method, apparatus, and terminal device. The embodiments of this application further provide a computer-readable storage medium, so that the terminal device can receive a data stream from a network side through two different WiFi networks, thereby increasing the download rate, shortening the download time, and improving the user experience.

In a first aspect, an embodiment of this application provides a data download method, applied to a terminal device. The terminal device accesses a first WiFi network through a first WiFi network interface and accesses a second WiFi network through a second WiFi network interface. The method includes: after detecting a data stream from a network side, obtaining a dual WiFi capability supported by the terminal device, the dual WiFi capability including a simultaneous dual band dual band dual concurrent capability and a real simultaneous dual band dual band dual concurrent capability; and receiving the data stream through the first WiFi network and/or the second WiFi network based on the dual WiFi capability supported by the terminal device.

In a possible implementation, the simultaneous dual band dual band dual concurrent capability includes that the first WiFi network and the second WiFi network operate independently and that the first WiFi network and the second WiFi network operate on different frequency bands respectively; and the real simultaneous dual band dual band dual concurrent capability includes that the first WiFi network and the second WiFi network operate on two frequency bands simultaneously and that a sum of download bandwidth used by the first WiFi network and download bandwidth used by the second WiFi network is less than or equal to maximum bandwidth of a WiFi network corresponding to the real simultaneous dual band dual band dual concurrent capability.

In a possible implementation, the receiving the data stream through the first WiFi network and/or the second WiFi network based on the dual WiFi capability supported by the terminal device may include: in a case that the dual WiFi capability supported by the terminal device is the simultaneous dual band dual band dual concurrent capability, receiving the data stream through the first WiFi network and the second WiFi network.

In a possible implementation, the receiving the data stream through the first WiFi network and/or the second WiFi network may include: establishing a first network path between the first WiFi network interface and the network side and establishing a second network path between the second WiFi network interface and the network side; sounding the first network path through the first WiFi network, to determine a path quality of the first network path; sounding the second network path through the second WiFi network, to determine a path quality of the second network path; and then, in a case that the path qualities of the first network path and the second network path are higher than a predetermined first path quality threshold, receiving the data stream through the first network path and the second network path.

In a possible implementation, the receiving the data stream through the first WiFi network and/or the second WiFi network based on the dual WiFi capability supported by the terminal device may include: in a case that the dual WiFi capability supported by the terminal device is the real simultaneous dual band dual band dual concurrent capability, receiving the data stream through a target WiFi network, where the target WiFi network is the first WiFi network or the second WiFi network.

In a possible implementation, in a case that the target WiFi network is the first WiFi network, the receiving the data stream through a target WiFi network may include: establishing a first network path between the first WiFi network interface and the network side; sounding the first network path through the first WiFi network, to determine a path quality of the first network path; and in a case that the path quality of the first network path is higher than a predetermined first path quality threshold, receiving the data stream through the first network path.

In a possible implementation, after the receiving the data stream through a target WiFi network, the terminal device may further measure download bandwidth currently used by the first WiFi network; in a case that the download bandwidth currently used by the first WiFi network is less than maximum bandwidth of a WiFi network corresponding to the real simultaneous dual band dual band dual concurrent capability, establish a second network path between the second WiFi network interface and the network side; sound the second network path through the second WiFi network, to determine a path quality of the second network path; and in a case that the path quality of the second network path is higher than a predetermined first path quality threshold, receive the data stream through the first network path and the second network path.

In a possible implementation, after receiving the data stream, the terminal device may further sound the path qualities of the first network path and the second network path; and disable a network path, in the first network path and the second network path, whose path quality is lower than a predetermined second path quality threshold.

In a second aspect, an embodiment of this application provides a data download apparatus, which is included in a terminal device. The apparatus has functions of implementing behaviors of the terminal device in the first aspect and the possible implementations of the first aspect. The function may be implemented by hardware, or may be implemented by corresponding software executed by hardware. The hardware or the software includes one or more modules or units corresponding to the function, for example, a receiving module or unit, a processing module or unit, a sending module or unit, and the like.

In a third aspect, an embodiment of this application provides a terminal device. The terminal device accesses a first WiFi network through a first WiFi network interface and accesses a second WiFi network through a second WiFi network interface. The terminal device includes one or more processors, a memory, a plurality of applications, and one or more computer programs, where the one or more computer programs are stored in the memory, the one or more computer programs include instructions, and the instructions, when executed by the terminal device, cause the terminal device to perform the following steps: detecting a data stream from a network side; obtaining a dual WiFi capability supported by the terminal device, the dual WiFi capability including a simultaneous dual band dual band dual concurrent capability and a real simultaneous dual band dual band dual concurrent capability; and receiving the data stream through the first WiFi network and/or the second WiFi network based on the dual WiFi capability supported by the terminal device.

In a possible implementation, the instructions, when executed by the terminal device, causing the terminal device to perform the step of receiving the data stream through the first WiFi network and/or the second WiFi network based on the dual WiFi capability supported by the terminal device may include: in a case that the dual WiFi capability supported by the terminal device is the simultaneous dual band dual band dual concurrent capability, receiving the data stream through the first WiFi network and the second WiFi network.

In a possible implementation, the instructions, when executed by the terminal device, causing the terminal device to perform the step of receiving the data stream through the first WiFi network and/or the second WiFi network may include: establishing a first network path between the first WiFi network interface and the network side and establishing a second network path between the second WiFi network interface and the network side; sounding the first network path through the first WiFi network, to determine a path quality of the first network path; sounding the second network path through the second WiFi network, to determine a path quality of the second network path; and in a case that the path qualities of the first network path and the second network path are higher than a predetermined first path quality threshold, receiving the data stream through the first network path and the second network path.

In a possible implementation, the instructions, when executed by the terminal device, the terminal device to perform the step of receiving the data stream through the first WiFi network and/or the second WiFi network based on the dual WiFi capability supported by the terminal device may include: in a case that the dual WiFi capability supported by the terminal device is the real simultaneous dual band dual band dual concurrent capability, receiving the data stream through a target WiFi network, where the target WiFi network is the first WiFi network or the second WiFi network.

In a possible implementation, in a case that the target WiFi network is the first WiFi network, the instructions, when executed by the terminal device, causing the terminal device to perform the step of receiving the data stream through a target WiFi network may include: establishing a first network path between the first WiFi network interface and the network side; sounding the first network path through the first WiFi network, to determine a path quality of the first network path; and in a case that the path quality of the first network path is higher than a predetermined first path quality threshold, receiving the data stream through the first network path.

In a possible implementation, after the instructions, when executed by the terminal device, causing the terminal device to perform the step of receiving the data stream through a target WiFi network, the terminal device may further perform the following steps: measuring download bandwidth currently used by the first WiFi network; in a case that the download bandwidth currently used by the first WiFi network is less than maximum bandwidth of a WiFi network corresponding to the real simultaneous dual band dual band dual concurrent capability, establishing a second network path between the second WiFi network interface and the network side; sounding the second network path through the second WiFi network, to determine a path quality of the second network path; and in a case that the path quality of the second network path is higher than a predetermined first path quality threshold, receiving the data stream through the first network path and the second network path.

In a possible implementation, after the instructions, when executed by the terminal device, causing the terminal device to perform the step of receiving the data stream, the terminal device may further perform the following steps: sounding the path qualities of the first network path and the second network path; and disabling a network path, in the first network path and the second network path, whose path quality is lower than a predetermined second path quality threshold.

It may be understood that the technical solutions of the second aspect and the third aspect of the embodiments of this application are consistent with the technical solution of the first aspect of the embodiments of this application, and beneficial effects obtained by each aspect and corresponding feasible implementations are similar, and details are not repeated herein again.

In a fourth aspect, an embodiment of this application provides a computer-readable storage medium. The computer-readable storage medium stores a computer program, and the computer program, when run on a computer, causes the computer to perform the method provided in the first aspect.

In a fifth aspect, an embodiment of this application provides a computer program. The computer program, when run on a computer, causes the computer program to perform the method provided in the first aspect.

In a possible design, the program in the fifth aspect may be stored in whole or in part on a storage medium packaged with a processor, or in part or in whole on a memory not packaged with a processor.

DETAILED DESCRIPTION OF ILLUSTRATIVE EMBODIMENTS

Terms used in implementations of this application are merely intended to explain specific embodiments of this application rather than limit this application.

In the related art, for a dual WiFi network smartphone only when a transmission rate of a single WiFi network is low, the smartphone may enable dual WiFi, to access two different WiFi networks to transmit network data simultaneously. Even in this way, a high latency and/or a low network speed still occur and the user experience is poor.

Based on the problems, an embodiment of this application provides a data download method, by which a data stream can be received from a network side through two different WiFi networks, thereby increasing the download rate, shortening the download time, and improving the user experience.

The data download method provided in this embodiment of this application may be applied to a terminal device, where the terminal device may be a device such as a smartphone, a tablet computer, a wearable device, an in-vehicle device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA), and a specific type of the terminal device is not limited in this embodiment of this application.

Figure 1:
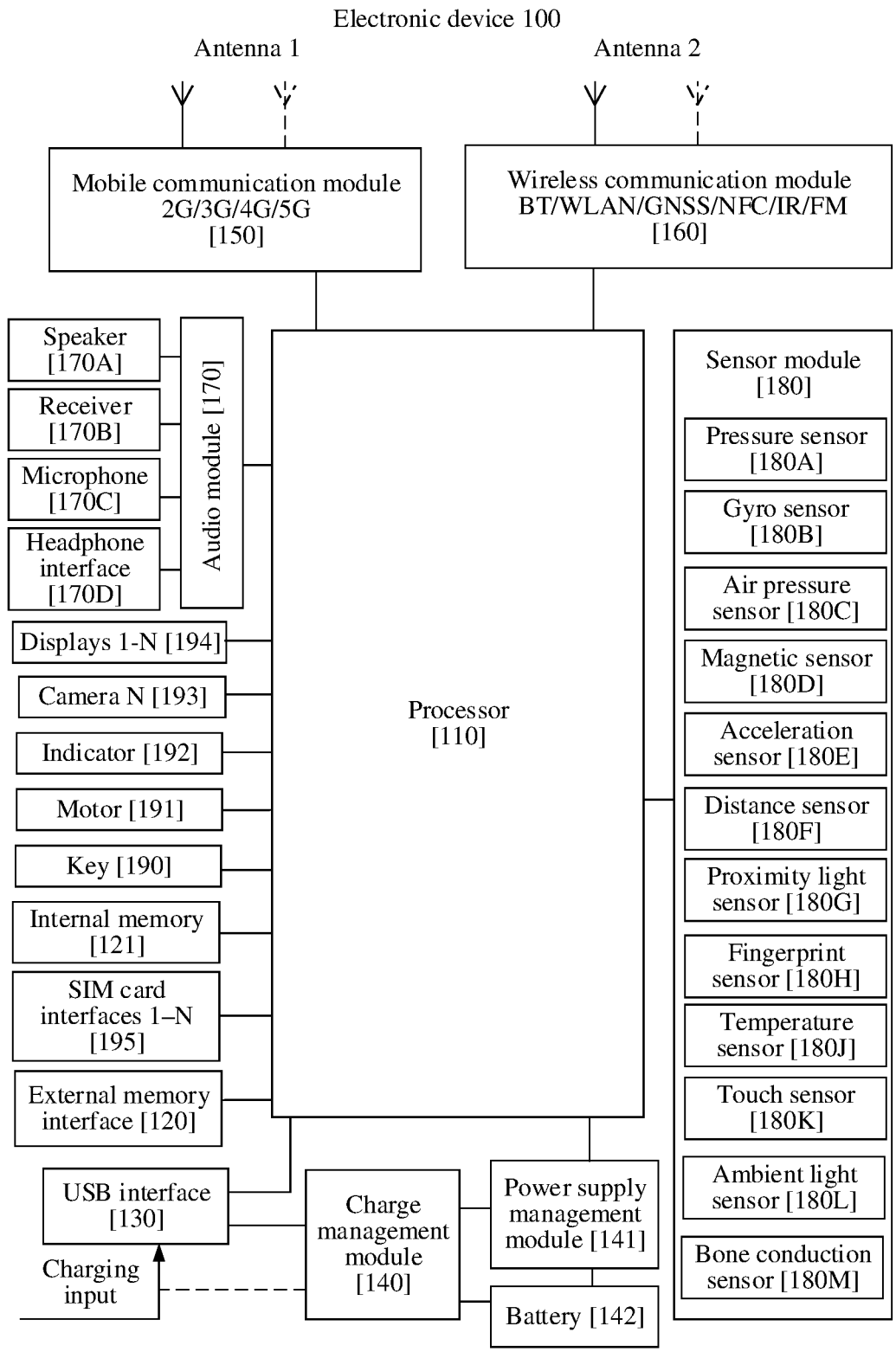
FIG. 1 is a schematic structural diagram of a terminal device according to an embodiment of this application.

For example, FIG. 1 is a schematic structural diagram of a terminal device according to an embodiment of this application. As shown in FIG. 1, a terminal device 100 may include a processor 110, an external memory interface 120, an internal memory 121, a universal serial bus (universal serial bus, USB) interface 130, a charge management module 140, a power supply management module 141, a battery 142, an antenna 1, an antenna 2, a mobile communication module 150, a wireless communication module 160, an audio module 170, a speaker 170A, a receiver 170B, a microphone 170C, a headphone interface 170D, a sensor module 180, a key 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, an air pressure sensor 180C, a magnetic sensor 180D, an acceleration sensor 180E, a distance sensor 180F, a proximity light sensor 180G, a fingerprint sensor 180H, a temperature sensor 180J, a touch sensor 180K, an ambient light sensor 180L, a bone conduction sensor 180M, and the like.

It may be understood that, the schematic structure shown in this embodiment of this application does not constitute specific limitation to terminal device 100. In some other embodiments of this application, the terminal device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modulation and demodulation processor, a graphics processing unit (graphics processing unit, GPU), an image signal processor (image signal processor, ISP), a controller, a video encoder and decoder, a digital signal processor (digital signal processor, DSP), a baseband processor, and/or a neural-network processing unit (neural-network processing unit, NPU), or the like. Different processing units may be separate devices, or may be integrated into one or more processors.

The controller may generate an operation control signal based on instruction operation code and a timing signal and implement control of taking an instruction and executing the instruction.

The processor 110 may be further provided with a memory for storing instructions and data. In some embodiments, the memory in processor 110 is a cache memory. The memory may store instructions or data that have just been used or recycled by the processor 110. In a case that the processor 110 needs to reuse the instructions or data, the processor 110 may invoke the instructions or data directly from the memory. Repeated accesses are avoided and waiting time of the processor 110 is reduced, thereby improving system efficiency.

In some embodiments, the processor 110 may include one or more interfaces. The interfaces may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, and/or a universal serial bus (universal serial bus, USB) interface, or the like.

The I2C interface is a bidirectional synchronous serial bus, and includes a serial data line (serial data line, SDA) and a serial clock line (derail clock line, DCL). In some embodiments, the processor 110 may include a plurality of sets of I2C buses. The processor 110 may be coupled to the touch sensor 180K, a charger, a flash, the camera 193, and the like through different I2C bus interfaces. For example, the processor 110 may be coupled to the touch sensor 180K through an I2C interface, so that the processor 110 and the touch sensor 180K communicate through an I2C bus interface, to implement a touch function of the terminal device 100.

The I2S interface may be configured for audio communication. In some embodiments, the processor 110 may include a plurality of sets of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headphone.

The PCM interface may also be configured for audio communication, to sample, quantify, and encode an analog signal. In some embodiments, the audio module 170 and the wireless communication module 160 may be coupled through a PCM bus interface. In some embodiments, the audio module 170 may also transmit an audio signal to the wireless communication module 160 through the PCM interface, to implement a function of answering a call through a Bluetooth headphone. Both the I2S interface and the PCM interface can be configured for audio communication.

The UART interface is a universal serial data bus for asynchronous communication. The bus may be a bidirectional communication bus. The bus converts data to be transmitted between serial communication and parallel communication. In some embodiments, the UART interface is typically configured to connect the processor 110 and the wireless communication module 160. For example, the processor 110 communicates through a UART interface with a Bluetooth module in the wireless communication module 160, to implement a Bluetooth function. In some embodiments, the audio module 170 may transmit, through the UART interface, an audio signal to the wireless communication module 160, to implement a function of playing music by using a Bluetooth headphone.

The MIPI interface may be configured to connect the processor 110 to peripheral devices such as the display 194 and the camera 193. The MIPI interface includes a camera serial interface (camera serial interface, CSI), a display serial interface (display serial interface, DSI), or the like. In some embodiments, the processor 110 and the camera 193 communicate through a CSI interface, to implement a photographing function of the terminal device 100. The processor 110 and the display 194 communicate through a DSI interface, to implement a display function of the terminal device 100.

A GPIO interface may be configured by software. The GPIO interface may be configured as a control signal or as a data signal. In some embodiments, the GPIO interface may be configured to connect the processor 110 to the camera 193, the display 194, the wireless communication module 160, the audio module 170, the sensor module 180, or the like. The GPIO interface may also be configured as an I2C interface, an I2S interface, a UART interface, an MIPI interface, or the like.

A USB interface 130 is an interface conforming to the USB standard specifications, specifically may be a Mini USB interface, a Micro USB interface, a USB Type C interface, or the like. The USB interface 130 may be configured to connect a charger to charge the terminal device 100, or may be configured to transfer data between the terminal device 100 and the peripheral devices, or may be configured to connect a headphone to play an audio through the headphone. The interface may also be configured to connect another electronic device, for example, an AR device or the like.

It may be understood that the interface connection relationship between the modules illustrated in this embodiments of this application is only an illustrative description and does not constitute a structural limitation to the terminal device 100. In some other embodiments of this application, the terminal device 100 may also adopt a different interface connection manner or a combination of a plurality of interface connection manners in the foregoing embodiments.

The charge management module 140 is configured to receive a charge input from the charger. The charger may be a wireless charger or a wired charger. In some embodiments of wired charging, the charge management module 140 may receive a charging input from a wired charger through a USB interface 130. In some embodiments of wireless charging, the charge management module 140 may receive a wireless charge input through a wireless charge coil of the terminal device 100. When charging the battery 142, the charge management module 140 may further supply power to the terminal device 100 through the power supply management module 141.

The power supply management module 141 is configured to connect the battery 142, the charge management module 140, and the processor 110. The power supply management module 141 receives an input from the battery 142 and/or the charge management module 140 to supply power to the processor 110, the internal memory 121, the display 194, the camera 193, and the wireless communication module 160. The power supply management module 141 may further be configured to monitor parameters such as battery capacity, battery cycle times, battery health status (leakage or impedance), and the like. In some other embodiments, the power supply management module 141 may alternatively be disposed in the processor 110. In some other embodiments, the power supply management module 141 and the charge management module 140 may alternatively be disposed in the same device.

The wireless communication function of the terminal device 100 may be implemented by the antenna 1, the antenna 2, the mobile communication module 150, the wireless communication module 160, the modulation and demodulation processor, the baseband processor, and the like.

The antenna 1 and the antenna 2 are configured to transmit and receive electromagnetic wave signals. Each antenna in the terminal device 100 may be configured to cover a single or a plurality of communication frequency bands. Different antennas may further be multiplexed to improve the utilization rate of the antennas. For example, the antenna 1 may be multiplexed to a diversity antenna of a wireless local area network. In some other embodiments, the antennas may be used with a tuning switch.

The mobile communication module 150 may provide a solution including wireless communication such as 2G/3G/4G/5G applied on the terminal device 100. The mobile communication module 150 may include at least one filter, a switch, a power amplifier, a low noise amplifier (low noise amplifier, LNA), or the like. The mobile communication module 150 may receive electromagnetic waves by the antenna 1, filter and amplify the received electromagnetic waves, and transmit the electromagnetic waves to the modulation and demodulation processor for demodulation. The mobile communication module 150 may alternatively amplify the signal modulated by the modulation and demodulation processor and convert the signal into electromagnetic waves through the antenna 1 to be radiated. In some embodiments, at least some of the functional modules of the mobile communication module 150 may be disposed in the processor 110. In some embodiments, at least some of the functional modules of the mobile communication module 150 may be disposed in the same device as at least some of the modules of the processor 110.

The modulation and demodulation processor may include a modulator and a demodulator. The modulator is configured to modulate a low frequency baseband signal to be sent into a medium and high frequency signal. The demodulator is configured to demodulate the received electromagnetic wave signal into a low frequency baseband signal. Then, the demodulator transmits the demodulated low frequency baseband signal to the baseband processor for processing. After being processed by the baseband processor, the low frequency baseband signal is transmitted to the application processor. The application processor outputs a sound signal through an audio device (not limited to the speaker 170A, the receiver 170B, or the like), or displays an image or video through the display 194. In some embodiments, the modulation and demodulation processor may be an independent device. In some other embodiments, the modulation and demodulation processor may be independent of the processor 110 and may be located in the same device as the mobile communication module 150 or other functional modules.

The wireless communication module 160 may provide wireless communication solution such as a wireless local area network (wireless local area networks, WLAN) (for example, a WiFi network), Bluetooth (Bluetooth, BT), global navigation satellite system (global navigation satellite system, GNSS), FM (frequency modulation, FM), near field communication (near field communication, NFC), or an infrared (infrared, IR) technology applied to the terminal device 100. The wireless communication module 160 may be one or more devices integrating at least one communication processing module. The wireless communication module 160 receives electromagnetic waves via the antenna 2, modulates and filters the electromagnetic wave signal, and transmits the processed signal to the processor 110. The wireless communication module 160 may alternatively receive a signal to be sent from the processor 110, modulate and amplify the signal, and convert the signal into electromagnetic waves through the antenna 2 to be radiated.

In this embodiment of this application, the wireless communication module 160 may include two WiFi network interfaces, respectively, a first WiFi network interface and a second WiFi network interface, and the wireless communication module 160 accesses a first WiFi network through the first WiFi network interface and accesses a second WiFi network through the second WiFi network interface.

In some embodiments, the antenna 1 of the terminal device 100 is coupled to the mobile communication module 150 and the antenna 2 is coupled to the wireless communication module 160, so that the terminal device 100 may communicate with the network and another device by using a wireless communication technology. The wireless communication technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a beidou satellite navigation system (beidou navigation satellite system, BDS), a quasi-zenith satellite system (quasi-zenith satellite system, QZSS), and/or satellite based augmentation systems (satellite based augmentation systems, SBAS).

The terminal device 100 implements a display function through the GPU, the display 194, an application processor, or the like. The GPU is a microprocessor for image processing and connects the display 194 and the application processor. The GPU is configured to perform mathematical and geometric calculations and to render graphics. The processor 110 may include one or more GPUs that execute program instructions to generate or change display information.

The display 194 is configured to display an image, a video, and the like. The display 194 includes a display panel. The display panel may adopt a liquid crystal display (liquid crystal display, LCD), an organic light-emitting diode (organic light-emitting diode, OLED), an active matrix organic light-emitting diode or an active matrix organic light-emitting diode (active matrix organic light-emitting diode, AMOLED), a flexible light-emitting diode (flexible light-emitting diode, FLED), Minilized, MicroLed, Micro-oLed, quantum dot light-emitting diode (quantum dot light emitting diodes, QLED), or the like. In some embodiments, the terminal device 100 may include 1 or N displays 194. N is a positive integer greater than 1.

The terminal device 100 may implement a photographing function through an ISP, the camera 193, the video encoder and decoder, the GPU, the display 194, and the application processor.

The ISP is configured to process data fed back by camera 193. For example, during photographing, a shutter is opened, a light ray is transmitted to a camera photosensitive element through a lens, and an optical signal is converted into an electrical signal, which is transmitted to the ISP for processing and converted into an image visible to naked eyes. The ISP may further perform algorithm optimization on the noise, brightness, and skin color of the image. The ISP may further perform parameter optimization on exposure, color temperature, or a like of the photographing scenario. In some embodiments, the ISP may be disposed in the camera 193.

The camera 193 is configured to capture a still image or video. An optical image of an object is generated through a lens and is projected to a photosensitive element. The photosensitive element may be a charge coupled device (charge coupled device, CCD) or a complementary metal-oxide-semiconductor (complementary metal-oxide-semiconductor, CMOS) phototransistor. The photosensitive element converts the optical signal to an electrical signal, which is then transmitted to the ISP for conversion into a digital image signal. The ISP outputs the digital image signal to the DSP for processing. The DSP converts the digital image signal into an image signal of a standard RGB or YUV format. In some embodiments, the terminal device 100 may include N cameras 193. N is a positive integer greater than 0.

The digital signal processor is configured to process a digital signal, and in addition a digital image signal, the digital signal processor may also process other digital signals. For example, during selection of a frequency by the terminal device 100, the digital signal processor is configured to perform a Fourier transform or the like on energy of the frequency.

The video encoder and decoder is configured to compress or decompress a digital video. The terminal device 100 may support one or more video encoders and decoders. In this way, the terminal device 100 may play or record videos of a plurality of encoding formats, for example, a moving picture experts group (moving picture experts group, MPEG)$_1$, MPEG$_2$, MPEG$_3$, MPEG$_4$, and the like.

An NPU is a neural network (neural-network, NN) computing processor. By using the structure of a biological neural network, for example, a transmission mode between neurons of a human brain, the NPU can process input information quickly and learn by itself continuously. The NPU may implement applications such as intelligent recognition of the terminal device 100, for example, image recognition, face recognition, voice recognition, text understanding, and the like.

The external memory interface 120 may be configured to connect an external memory card, such as a Micro SD card, to expand a storage capacity of the terminal device 100. The external memory card communicates with the processor 110 through the external memory interface 120 to implement a data storage function. For example, music, video, and other files are saved in the external memory card.

The internal memory 121 may be configured to store computer executable program code, including instructions. The internal memory 121 may include a program storage area and a data storage area. The program storage area may store an operating system, an application program required for at least one function (for example, a sound playback function, an image playback function, or the like), and the like. The data storage area may store data (for example, audio data, a phone book, or the like) created during use of the terminal device 100. In addition, the internal memory 121 may include a high-speed random access memory and may further include a non-volatile memory such as at least one disk storage device, a flash memory device, and a universal flash storage (universal flash storage, UFS). The processor 110 executes the functional applications and data processing of the terminal device 100 by executing the instructions stored in the internal memory 121 and/or the instructions stored in a memory provided in the processor.

The terminal device 100 may implement an audio function through the audio module 170, the speaker 170A, the receiver 170B, the microphone 170C, the headphone interface 170D, the application processor, or the like. for example, music playing or recording.

The audio module 170 is configured to convert a digital audio information into an analog audio signal to output and is further configured to convert an analog audio input into a digital audio signal. The audio module 170 may further be configured to encode and decode an audio signal. In some embodiments, the audio module 170 may be disposed in the processor 110 or some of functional modules of the audio module 170 may be disposed in the processor 110.

The speaker 170A, also referred to as a "horn", is configured to convert an audio electrical signal into a sound signal. The terminal device 100 may be used to listen to music or listen to a hands-free call through the speaker 170A.

The receiver 170B, also referred to as a "headset", is configured to convert an audio electrical signal into a sound signal. In a case that the terminal device 100 is used to answer a call or a voice message, the receiver 170B may be brought close to a human ear for listening.

The microphone 170C, also referred to as "MIC" and "mike", is configured to convert a sound signal into an electrical signal. During a call or sending of a voice message, a user may make a sound by approaching the microphone 170C through the human mouth and input a voice signal to the microphone 170C. The terminal device 100 may be provided with at least one microphone 170C. In some other embodiments, the terminal device 100 may be provided with two microphones 170C, which in addition to collecting sound signals may also implement a noise reduction function. In some other embodiments, the terminal device 100 may also be provided with three, four, or more microphones 170C to implement acquisition of sound signals, noise reduction, recognition of sound sources, directional recording functions, and the like.

The headphone interface 170D is configured to connect a wired headphone. The headphone interface 170D may be a USB interface 130, or a 3.5 mm open mobile device platform (open mobile terminal platform, OMTP) standard interface, or a cellular telecommunications industry association of the USA (cellular telecommunications industry association of the USA, CTIA) standard interface.

The pressure sensor 180A is configured to sense a pressure signal and may convert the pressure signal into an electrical signal. In some embodiments, the pressure sensor 180A may be disposed on the display 194. There are many types of pressure sensors 180A, such as, resistive pressure sensors, inductive pressure sensors, and capacitive pressure sensors. The capacitive pressure sensor may be a parallel plate including at least two parallel plates having an electrically conductive material. In a case that a force is applied onto the pressure sensor 180A, a capacitance between electrodes changes. The terminal device 100 determines an intensity of the pressure according to a change in the capacitance. In a case that a touch operation acts on the display 194, the terminal device 100 measures the intensity of the touch operation by using the pressure sensor 180A. The terminal device 100 may also calculate a touched position based on a measurement signal of the pressure sensor 180A. In some embodiments, touch operations that act on a same touch position with different touch operation intensities may correspond to different operation instructions. For example, in a case that a touch operation with a touch operation intensity less than a first pressure threshold acts on a short message application icon, an instruction of view a short message is executed. In a case that a touch operation with a touch operation intensity greater than or equal to the first pressure threshold acts on the short message application icon, an instruction of create a new short message is executed.

The gyro sensor 180B may be configured to determine a motion attitude of the terminal device 100. In some embodiments, angular velocities of the terminal device 100 around three axes (that is, x, y, and z axes) may be determined by the gyro sensor 180B. The gyro sensor 180B may be configured for jitter prevention in photographing. For example, in a case that a shutter is pressed, the gyro sensor 180B measures a jitter angle of the terminal device 100 and calculates, according to the angle, a distance to be compensated by a lens module, so that jitter of the terminal device 100 is compensated through a reverse motion of the lens, thereby implementing jitter prevention. The gyro sensor 180B may also be configured for scenarios of navigation and motion sensing games.

The air pressure sensor 180C is configured to measure an air pressure. In some embodiments, the terminal device 100 calculates an altitude based on an air pressure value measured by the air pressure sensor 180C, to assist in positioning and navigation.

The magnetic sensor 180D includes a Hall sensor. The terminal device 100 may use the magnetic sensor 180D to detect opening and closing of a flip leather case. In some embodiments, in a case that the terminal device 100 is a flip device, the terminal device 100 may detect opening and closing of the flip by using the magnetic sensor 180D. Further, features such as automatic unlocking of the flip cover are set based on the detected opening and closing states of the leather case or opening and closing states of the flip cover.

The acceleration sensor 180E may measure magnitudes of accelerations of the terminal device 100 in various directions (generally three axes); in a case that the terminal device 100 is stationary, measure a magnitude and direction of gravity; and may further be configured to identify a posture of the electronic device, applied to applications such as horizontal and vertical screen switching, pedometer, or the like.

The distance sensor 180F is configured to measure a distance. The terminal device 100 may measure a distance by infrared or laser. In some embodiments, in a photographing scenario, the terminal device 100 may use the distance sensor 180F to measure a distance to achieve fast focusing.

The proximity light sensor 180G may include, for example, a light-emitting diode (LED) and a light detector, for example, a photodiode. The light-emitting diode may be an infrared light-emitting diode. The terminal device 100 emits infrared light through the light emitting diode. The terminal devices 100 detects infrared reflected light from a nearby object by using the photodiode. In a case that sufficient reflected light is detected, it may be determined that there is an object near the terminal device 100. In a case that insufficient reflected light is detected, the terminal device 100 may determine that there is no object near the terminal device 100. The terminal device 100 may detect, by using the proximity light sensor 180G, whether a user is holding the terminal device 100 close to the ear for a call, so as to automatically turn off the screen to achieve the purpose of saving electricity. The proximity light sensor 180G may also be used in a leather case mode or a pocket mode to automatically unlock and lock the screen.

The ambient light sensor 180L is configured to sense an ambient light brightness. The terminal device 100 may adaptively adjust the brightness of the display 194 according to a perceived ambient light brightness. The ambient light sensor 180L may also be configured to automatically adjust white balance during photographing. The ambient light sensor 180L may also be used together with the proximity light sensor 180G, to detect whether the terminal device 100 is in a pocket, to prevent accidental touch.

The fingerprint sensor 180H is configured to acquire a fingerprint. The terminal device 100 may implement fingerprint unlocking, application lock access, fingerprint photographing, fingerprint answering incoming calls, and the like by using features of the acquired fingerprint.

The temperature sensor 180J is configured to measure a temperature. In some embodiments, the terminal device 100 perform a temperature processing strategy by using the temperature measured by the temperature sensor 180J. For example, in a case that the temperature reported by the temperature sensor 180J exceeds a threshold, the terminal device 100 performs performance reduction of a processor located near the temperature sensor 180J, to reduce power consumption and implement thermal protection. In some other embodiments, in a case that the temperature is lower than another threshold, the terminal device 100 heats the battery 142, to avoid abnormal shutdown of the terminal device 100 caused by a low temperature. In some other embodiments, in a case that the temperature is lower than another threshold, the terminal device 100 boosts an output voltage of the battery 142, to avoid abnormal shutdown caused by a low temperature.

The touch sensor 180K is also referred as a "touch device". The touch sensor 180K can be disposed in the display 194, and the touch sensor 180K and the display 194 constitutes a touch screen, also referred to as a "touch-screen". The touch sensor 180K is configured to detect a touch operation acting on or near it. The touch sensor may pass a detected touch operation to the application processor to determine a touch event type. A visual output related to a touch operation may be provided through the display 194. In some other embodiments, the touch sensor 180K may also be disposed on a surface of the terminal device 100, which is different from a position of the display 194.

The bone conduction sensor 180M may obtain a vibration signal. In some embodiments, the bone conduction sensor 180M may obtain a vibration signal of an acoustic portion vibrating bone of a human body. The bone conduction sensor 180M may also contact a human pulse and receive a blood pressure beating signal. In some embodiments, the bone conduction sensor 180M may also be disposed in a headphone to integrate a bone conduction headphone. The audio module 170 may parse a voice signal based on the vibration signal of the sound portion vibrating bone obtained by the bone conduction sensor 180M, to implement a voice function. The application processor may parse heart rate information based on the blood pressure beating signal obtained by the bone conduction sensor 180M, to implement a heart rate measurement function.

The key 190 includes a power-on key, a volume key, or the like. The key 190 may be a mechanical key, or a touch key. The terminal device 100 may receive a key input and generate a key signal input related to user settings and functional control of the terminal device 100.

The motor 191 may generate a vibration prompt. The motor 191 may be configured for an incoming call vibration prompt or for a touch vibration feedback. For example, touch operations applied to different applications (for example, photographing, audio playback, or the like) may correspond to different vibration feedback effects. The motor 191 may also correspond to different vibration feedback effects for touch operations acting on different areas of the display 194. Different application scenarios (for example, time reminder, information receipt, alarm clock, game, or the like) may also correspond to different vibration feedback effects. The touch vibration feedback effect may also support customization.

The indicator 192 may be an indicator light, may be configured to indicate a state of charge or a change in charge, or may be configured to indicate a message, a missed call, a notification, and the like.

The SIM card interface 195 is configured to connect a SIM card. The SIM card may be inserted into the SIM card interface 195 or removed from the SIM card interface 195 to connect the SIM card to or to remove the SIM card from the terminal device 100. The terminal device 100 may support 1 or N SIM card interfaces. N is a positive integer greater than 1. The SIM card interface 195 may support a Nano SIM card, a Micro SIM card, a SIM card, or the like. A plurality of cards may be inserted into a same SIM card interface 195. The types of the plurality of cards may be the same or different. The SIM card interface 195 may also be compatible with different types of SIM cards. The SIM card interface 195 may also be compatible with external memory cards. The terminal device 100 interacts with the network through the SIM card, to implement functions such as call and data communication. In some embodiments, the terminal device 100 adopts an eSIM, that is, an embedded SIM card. The eSIM card may be embedded in the terminal device 100 and cannot be separated from the terminal device 100.

A software system of the terminal device 100 may adopt a hierarchical architecture, an event driven architecture, a microcore architecture, a microservice architecture, or a cloud architecture. In the embodiments of this application, for example, in a hierarchical architecture, the software structure of the terminal device 100 is described.

Figure 2:
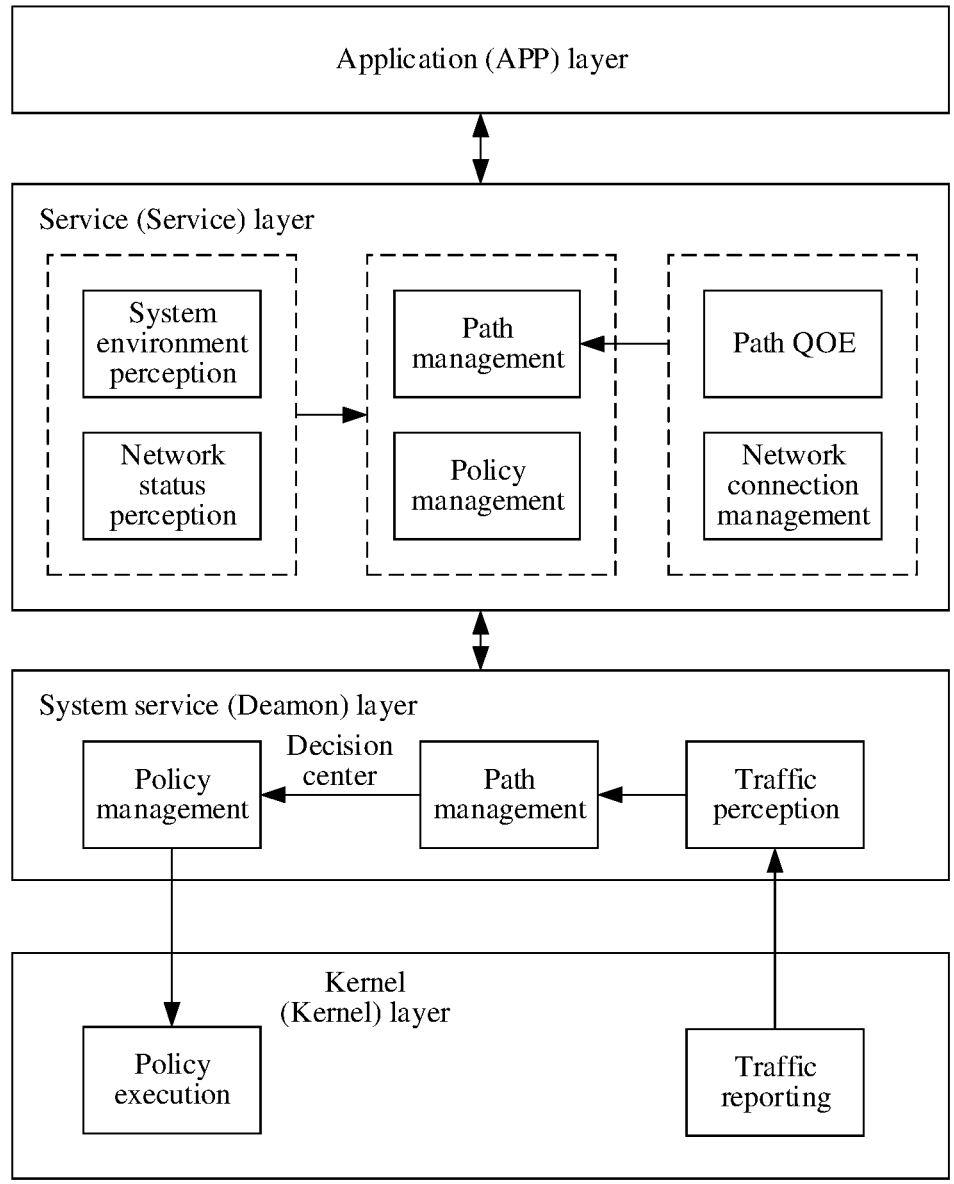
FIG. 2 is a block diagram of a software structure of a terminal device 100 according to an embodiment of this application.

FIG. 2 is a block diagram of a software structure of a terminal device 100 according to an embodiment of this application.

In the hierarchical architecture, software is divided into a plurality of layers, each of which has a clear role and division of labor. Communication between layers is performed through software interfaces. In this embodiment, the software system of the terminal device 100 is divided into four layers, which from top to bottom respectively are an application (application, APP) layer, a service (Service) layer, a process daemon (Deamon) layer, and a kernel (Kernel) layer.

The application layer may include a series of application packages. For example, the application packages may include applications such as cameras, libraries, calendars, calls, maps, navigation, WLAN, Bluetooth, music, video and/or SMS.

The service layer includes the following functional modules:
1) network status perception: support multi-channel WLAN, multi-card data service status perception;
2) system environment perception: handle events such as APP exit or opening, APP front and back office switching, installation or uninstallation;
3) policy management: generate a policy template based on a perception system, for use in specific engines of applications;
4) path management: path status management, or start or stop of paths; and
5) quality of experience (Quality of Experience, QoE): path quality assessment.

The process daemon layer includes the following functional modules:
1) path management: used for statistical summary of path quality information;
2) policy management: responsible for managing flow switching policies and flow binding policies; and
3) traffic perception: intelligent flow perception, identification, and statistics.

The kernel layer includes the following functional modules:
1) traffic reporting: responsible for collecting and reporting flow information;
2) policy management: perform flow switching processing and/or flow binding.

For ease of understanding, in the following embodiments of this application, for example, the terminal device 100 having the structures in FIG. 1 and FIG. 2 is used in combination with the accompanying drawings and application scenarios to specifically illustrate the data download method provided in the embodiments of this application.

Figure 3:
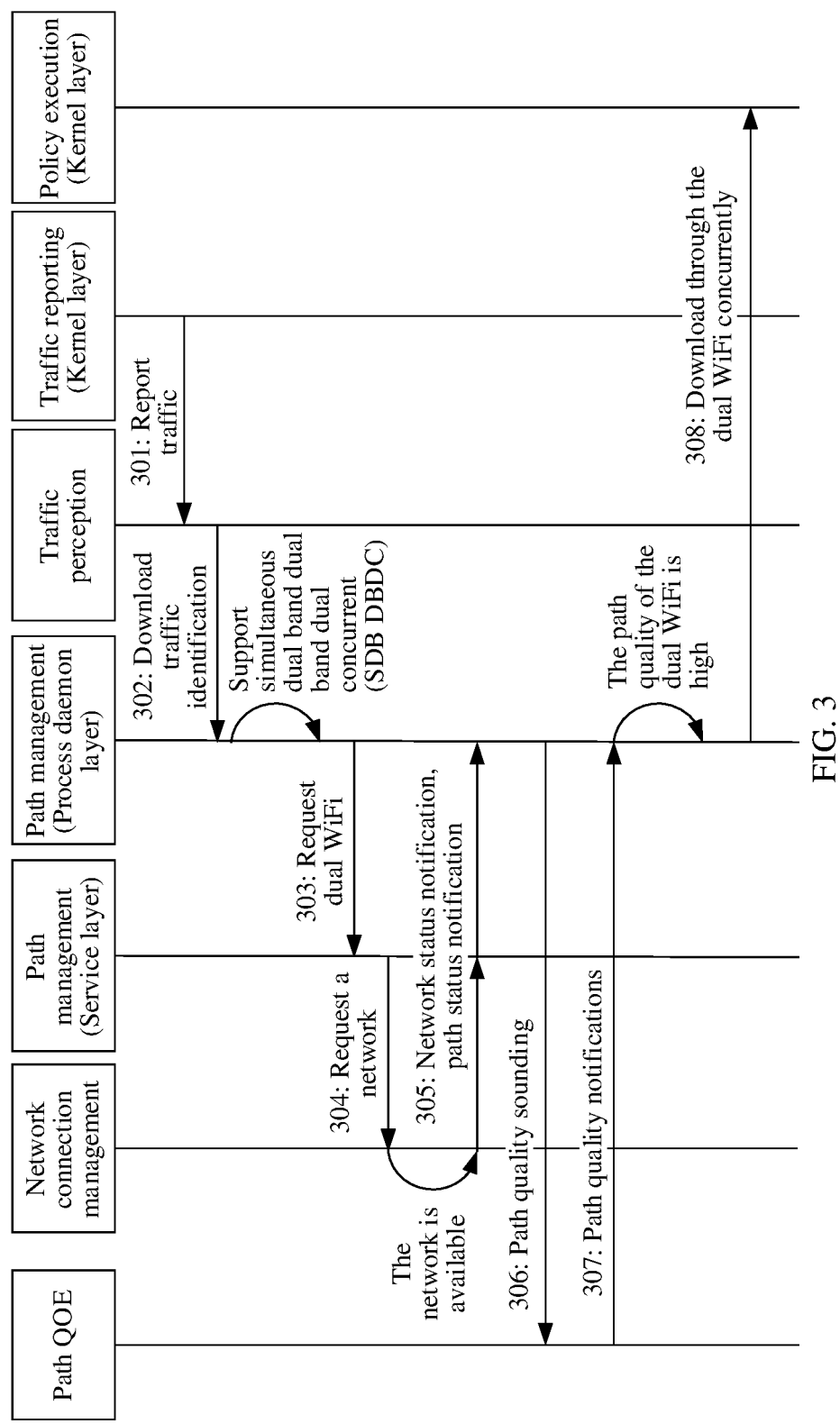
FIG. 3 is a flowchart of a data download method according to an embodiment of this application.

FIG. 3 is a flowchart of a data download method according to an embodiment of this application. As shown in FIG. 3, the data download method may include the following steps:

Step 301: A traffic reporting module of a kernel layer detects traffic and reports the traffic to a traffic perception module of a process daemon layer.

Step 302: The traffic perception module determines that the traffic reported by the traffic reporting module is a data stream from a network side and notifies a path management module of the process daemon layer that the data stream is download traffic.

Step 303: In a case that a dual WiFi capability supported by a wireless communication module 160 in the terminal device 100 is a simultaneous dual band dual band dual concurrent (simultaneous dual band dual band dual concurrent, SDB DBDC) capability, the path management module of the process daemon layer directly requests dual WiFi from a path management module of a service layer after learning that the data stream is the download traffic.

During specific implementation, the path management module of the process daemon layer may determine, according to parameters such as a model or a device identification of the terminal device 100, or a model of a WiFi chip used in the terminal device 100, that the dual WiFi capability supported by the wireless communication module 160 is the SDB DBDC capability.

The SDB DBDC capability is the simultaneous dual band dual band dual concurrent capability. The SDB DBDC is a specific WiFi dual band operation mode, which means that a router can simultaneously generate two independent wireless networks, namely, a first WiFi network and a second WiFi network, respectively corresponding to 2.4 GHz and 5 GHz frequency bands. The two independent WiFi networks may adopt different service set identifiers (service set identifier, SSID) or a same SSID. The first WiFi network and the second WiFi network run independently and can be executed concurrently. During specific implementation, the SDB DBDC is usually implemented by using two integrated circuit (integrated circuit, IC) chips, or a main module of a frequency radio front end of the wireless communication module 160 is composed of two ICs.

Step 304: The path management module of the service layer requests a network connection management module of the service layer for network sounding, to obtain an available network path.

Step 305: After obtaining through sounding that both the first WiFi network and the second WiFi network are available, the network connection management module of the service layer establishes a first network path between a first WiFi network interface and the network side, establishes a second network path between a second WiFi network interface and the network side, and then notifies network status and available network paths of the first WiFi network and the second WiFi network to the path management module of the process daemon layer.

Step 306: The path management module of the process daemon layer notifies a path QOE module of the service layer to sound path qualities of the available network paths. Then, the path QOE module sounds the first network path between the first WiFi network interface and the network side through the first WiFi network, to determine a path quality of the first network path; and sounds the second network path between the second WiFi network interface and the network side through the second WiFi network, to determine a path quality of the second network path.

Specifically, the path quality may be calculated according to a signal strength, a signal-to-signal ratio, a channel busy rate, and/or a transceiver packet rate.

Step 307: The path QOE module notifies the path quality obtained through sounding to the path management module of the process daemon layer.

Step 308: In a case that the path qualities of the first network path and the second network path are higher than a predetermined first path quality threshold, the path management module of the process daemon layer notifies a policy execution module of a kernel layer to receive the data stream through the first network path and the second network path.

The first path quality threshold may be set according to system performance and/or demands to be achieved or the like during specific implementation, and the magnitude of the first path quality threshold is not limited in this embodiment.

Then, the policy execution module receives the data stream from the network side through the first network path and the second network path, that is, the policy execution module downloads concurrently through the dual WiFi.

In the data download method, after detecting the download traffic, the terminal device directly downloads the data stream from the network side by using the dual WiFi, thereby improving the download rate, shortening the download time, and improving the user experience.

Figure 4:
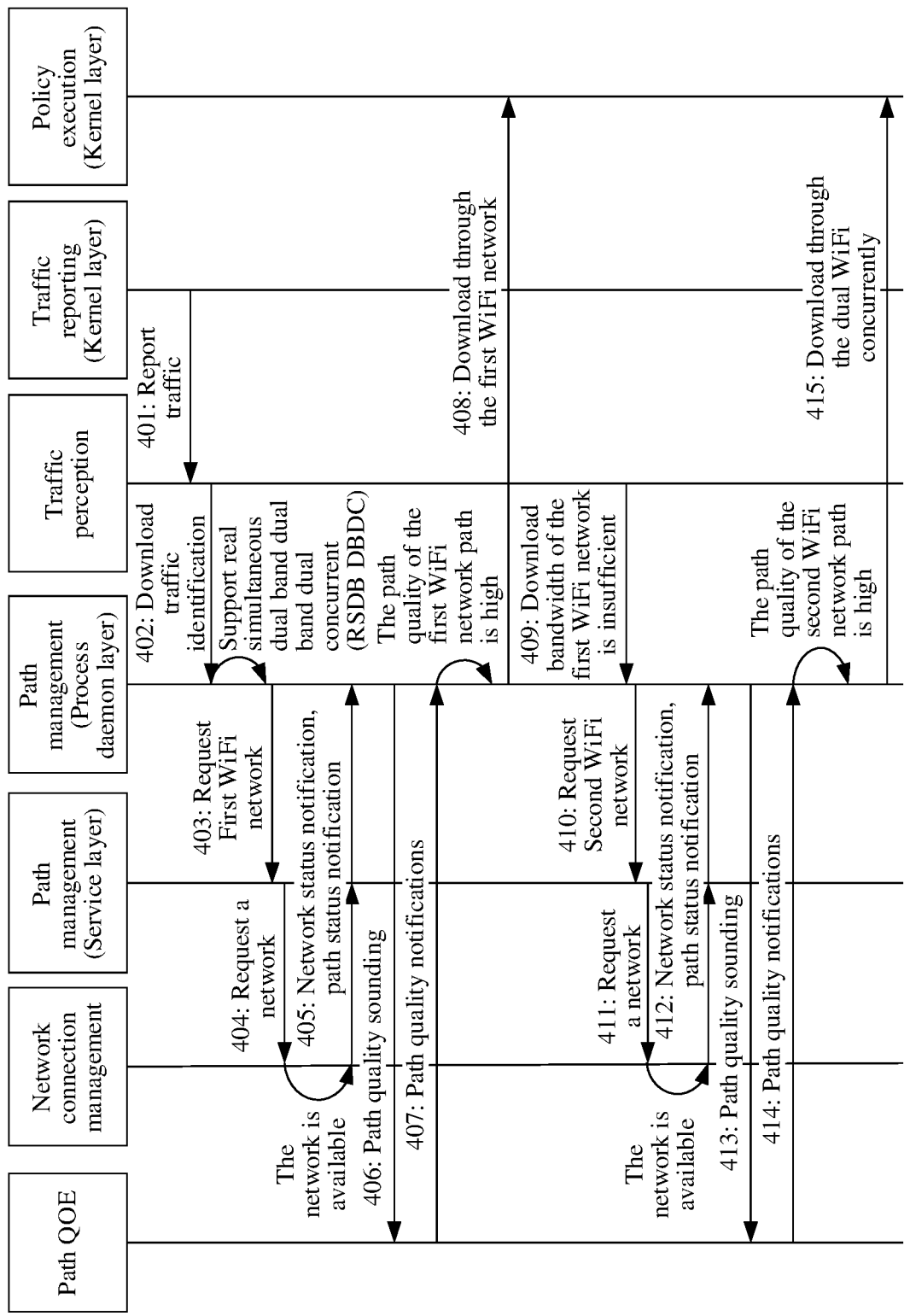
FIG. 4 is a flowchart of a data download method according to another embodiment of this application.

FIG. 4 is a flowchart of a data download method according to another embodiment of this application. As shown in FIG. 4, the data download method may include the following steps:

Step 401: A traffic reporting module of a kernel layer detects traffic and reports the traffic to a traffic perception module of a process daemon layer.

Step 402: The traffic perception module determines that the traffic reported by the traffic reporting module is a data stream from a network side and notifies a path management module of the process daemon layer that the data stream is download traffic.

Step 403: In a case that a dual WiFi capability supported by a wireless communication module 160 in the terminal device 100 is a real simultaneous dual band dual band dual concurrent (real simultaneous dual band dual band dual concurrent, RSDB DBDC) capability, the path management module of the process daemon layer requests a first WiFi network from a path management module of a service layer after learning that the data stream is the download traffic.

During specific implementation, the path management module of the process daemon layer may determine, according to parameters such as a model or a device identification of the terminal device 100, or a model of a WiFi chip used in the terminal device 100, that the dual WiFi capability supported by the wireless communication module 160 is the RSDB DBDC capability.

The RSDB DBDC capability is real simultaneous dual band dual band dual concurrent capability. The RSDB is a new technology that can operate on 5 GHz and 2.4 GHz frequency bands simultaneously, and this "Real" emphasizes that this type of operations is performed concurrently and simultaneously. However, since the specific operating mechanism of the RSDB is set by an APP, from a perspective of hardware, IC manufacturers only provide a single IC that integrates two independent circuits, and one IC may be invoked through an upper layer program, to operate simultaneously on the two frequency bands of 5 GHz and 2.4 GHz.

Step 404: The path management module of the service layer requests a network connection management module of the service layer for network sounding, to obtain an available network path.

Step 405: The network connection management module of the service layer obtains through sounding that a target WiFi network is available. The target WiFi network may be the first WiFi network or the second WiFi network. For ease of description, in the following description, for example, the target WiFi network is the first WiFi network.

After the network connection management module obtains through sounding that the target WiFi network is available, the first network path between the first WiFi network interface and the network side is established, and the network status and the available network path of the first WiFi network are notified to the path management module of the process daemon layer.

Step 406: The path management module of the process daemon layer notifies a path QOE module of the service layer to sound path qualities of the available network paths. Then, the path QOE module sounds the first network path between the first WiFi network interface and the network side through the first WiFi network, to determine a path quality of the first network path.

Specifically, the path quality may be calculated according to a signal strength, a signal-to-signal ratio, a channel busy rate, and/or a transceiver packet rate.

Step 407: The path QOE module notifies the path quality obtained through sounding to the path management module of the process daemon layer.

Step 408: In a case that the path quality of the first network path is higher than a predetermined first path quality threshold, the path management module of the process daemon layer notifies a policy execution module of a kernel layer to receive the data stream through the first network path.

The first path quality threshold may be set according to system performance and/or demands to be achieved or the like during specific implementation, and the magnitude of the first path quality threshold is not limited in this embodiment.

Then, the policy execution module receives the data stream from the network side through the first network path.

Step 409: In the process of receiving the data stream, the traffic perception module of the process daemon layer detects that download bandwidth currently used by the first WiFi network is less than maximum bandwidth of a WiFi network corresponding to the RSDB DBDC capability; and then, the traffic perception module notifies the path management module of the process daemon layer that the download bandwidth of the first WiFi network is insufficient.

During specific implementation, the download bandwidth currently used by the first WiFi network being less than the maximum bandwidth of the WiFi network corresponding to RSDB DBDC capability may include: the download bandwidth currently used by the first WiFi network is less than N % of the maximum bandwidth of the WiFi network corresponding to RSDB DBDC capability, where N is a positive number less than or equal to 100. N may be set according to system performance and/or demands to be implemented during specific implementation; and in this embodiment, N is not limited, and for example, N may be 50.

Step 410: The path management module of the process daemon layer requests the second WiFi network from the path management module of the service layer after learning that the download bandwidth of the first WiFi network is insufficient.

Step 411: The path management module of the service layer requests a network connection management module of the service layer for network sounding, to obtain an available network path.

Step 412: After obtaining through sounding that the second WiFi network is available, the network connection management module of the service layer establishes a second network path between a second network interface and the network side and notifies the path management module of the process daemon layer of network status and an available network path.

Step 413: The path management module of the process daemon layer notifies a path QOE module of the service layer to sound path qualities of the available network paths. Then, the path QOE module sounds the second network path between the second WiFi network interface and the network side through the second WiFi network, to determine a path quality of the second network path.

Specifically, the path quality may be calculated according to a signal strength, a signal-to-signal ratio, a channel busy rate, and/or a transceiver packet rate.

Step 414: The path QOE module notifies the path quality obtained through sounding to the path management module of the process daemon layer.

Step 415: In a case that the path quality of the second network path is higher than the predetermined first path quality threshold, the path management module of the process daemon layer notifies the policy execution module of the kernel layer to receive the data stream through the first network path and the second network path.

The first path quality threshold may be set according to system performance and/or demands to be achieved or the like during specific implementation, and the magnitude of the first path quality threshold is not limited in this embodiment.

Then, the policy execution module receives the data stream from the network side through the first network path and the second network path, that is, the policy execution module downloads concurrently through the dual WiFi.

It should be noted that, in this embodiment shown in FIG. 4 of this application, in a case that the data stream from the network side is concurrently downloaded through the dual WiFi, a sum of the download bandwidth used by the first WiFi network and the download bandwidth used by the second WiFi network does not exceed the maximum bandwidth of the WiFi network corresponding to the RSDB DBDC capability.

In addition, in the embodiments shown in FIG. 3 and FIG. 4 of this application, after the policy execution module receives the data stream from the network side, the path QOE module of the service layer may further dynamically sound the path qualities of the first network path and the second network path; and then disable a network path, in the first network path and the second network path, whose path quality is lower than a predetermined second path quality threshold.

Specifically, the path quality may be calculated according to a signal strength, a signal-to-signal ratio, a channel busy rate, and/or a transceiver packet rate.

The second path quality threshold is less than the first path quality threshold. The magnitude of the second path quality threshold may be set according to system performance and/or demands to be achieved or the like during specific implementation, and the magnitude of the second path quality threshold is not limited in this embodiment.

Figure 5:
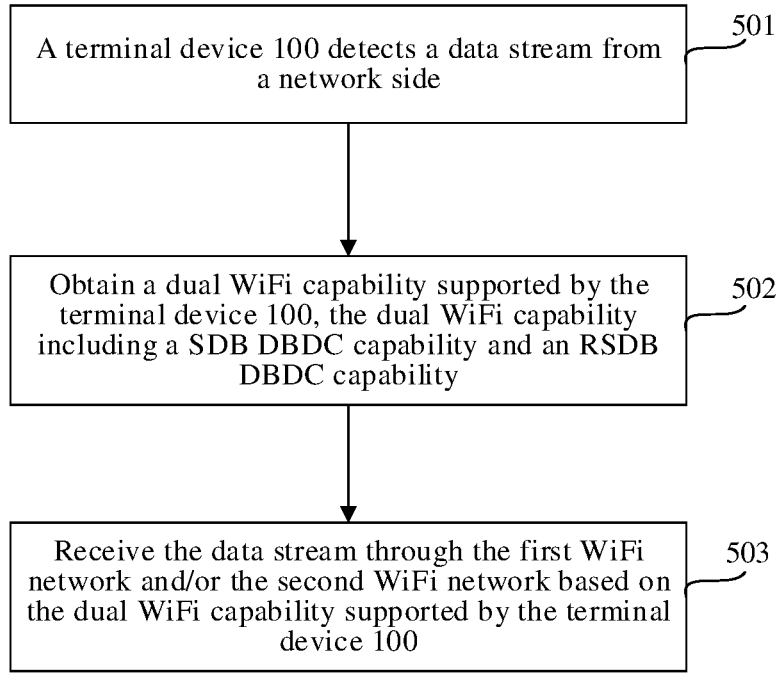
FIG. 5 is a flowchart of a data download method according to another embodiment of this application.

In this embodiment, the path quality being lower than the predetermined second path quality threshold means that the path quality of the network path is poor. Therefore, by disabling the network path with a poor path quality, the download rate of the data stream can be guaranteed, thereby improving the user experience. In combination with the foregoing embodiments and related accompanying drawings, an embodiment of this application provides a data download method, which may be implemented in the terminal device 100. FIG. 5 is the flowchart a data download method according to another embodiment of this application. The data download method is applied to a terminal device 100. The terminal device 100 accesses a first WiFi network through a first WiFi network interface and accesses a second WiFi network through a second WiFi network interface. As shown in FIG. 5, the data download method may include the following steps:

Step 501: The terminal device 100 detects a data stream from a network side.

Step 502: Obtain a dual WiFi capability supported by the terminal device 100, the dual WiFi capability including a SDB DBDC capability and an RSDB DBDC capability.

The simultaneous dual band dual band dual concurrent capability includes that the first WiFi network and the second WiFi network operate independently and that the first WiFi network and the second WiFi network operate on different frequency bands respectively.

The real simultaneous dual band dual band dual concurrent capability includes that the first WiFi network and the second WiFi network operate on two frequency bands simultaneously and that a sum of download bandwidth used by the first WiFi network and download bandwidth used by the second WiFi network is less than or equal to maximum bandwidth of a WiFi network corresponding to the real simultaneous dual band dual band dual concurrent capability.

Step 503: Receive the data stream through the first WiFi network and/or the second WiFi network based on the dual WiFi capability supported by the terminal device 100.

In an implementation of this embodiment, step 503 may include: in a case that the dual WiFi capability supported by the terminal device 100 is the SDB DBDC capability, receiving the data stream through the first WiFi network and the second WiFi network.

Specifically, the receiving the data stream through the first WiFi network and/or the second WiFi network may include: establishing a first network path between the first WiFi network interface and the network side and establishing a second network path between the second WiFi network interface and the network side; sounding the first network path through the first WiFi network, to determine a path quality of the first network path; sounding the second network path through the second WiFi network, to determine a path quality of the second network path; and then, in a case that the path qualities of the first network path and the second network path are higher than a predetermined first path quality threshold, receiving the data stream through the first network path and the second network path.

In another implementation of this embodiment, step 503 may include: in a case that the dual WiFi capability supported by the terminal device 100 is the RSDB DBDC capability, receiving the data stream through a target WiFi network. The target WiFi network is the first WiFi network or the second WiFi network.

Specifically, in a case that the target WiFi network is the first WiFi network, the receiving the data stream through a target WiFi network may include: establishing a first network path between the first WiFi network interface and the network side; sounding the first network path through the first WiFi network, to determine a path quality of the first network path; and then, in a case that the path quality of the first network path is higher than a predetermined first path quality threshold, receiving the data stream through the first network path.

Further, after the receiving the data stream through a target WiFi network, the method may further include: measuring download bandwidth currently used by the first WiFi network; in a case that the download bandwidth currently used by the first WiFi network is less than maximum bandwidth of a WiFi network of the RSDB DBDC capability, establishing a second network path between the second WiFi network interface and the network side; sounding the second network path through the second WiFi network, to determine a path quality of the second network path; and in a case that the path quality of the second network path is higher than a predetermined first path quality threshold, receiving the data stream through the first network path and the second network path.

In this embodiment of this application, after receiving the data stream, the terminal device 100 may further sound the path qualities of the first network path and the second network path; and disable a network path, in the first network path and the second network path, whose path quality is lower than a predetermined second path quality threshold.

By the data download method, a data stream can be received from a network side through two different WiFi networks, thereby increasing the download rate, shortening the download time, and further improving the user experience.

It may be understood that some or all of the steps or operations in the foregoing embodiments are merely examples, and the embodiments of this application may also perform other operations or modifications of the operations. In addition, the steps may be performed in an order different from that presented in the foregoing embodiments, and it is possible that not all the operations in the foregoing embodiments are to be performed. It can be understood that, to implement the functions, the terminal device includes a corresponding hardware and/or software module for executing the functions. In combination with the algorithm steps in the examples described in the embodiments of this application, the embodiments of this application may be implemented by hardware or a combination of hardware and computer software. Whether a function is performed by hardware or computer software driving hardware depends on particular applications and design constraints of the technical solutions. A person of skill in the art may use different methods to implement the described functions with reference to embodiments for each particular application, but it should not be considered that the implementation goes beyond the scope of this application.

In this embodiment, division of functional modules of the terminal device may be performed according to the foregoing method embodiments. For example, each functional module may be divided corresponding to each function, and two or more functions may alternatively be integrated to one module. The integrated module may be implemented in a form of hardware. It should be noted that the division of the modules in this embodiment is illustrative and is merely logical function division, and there can be other division modes in actual implementation.

Figure 6:
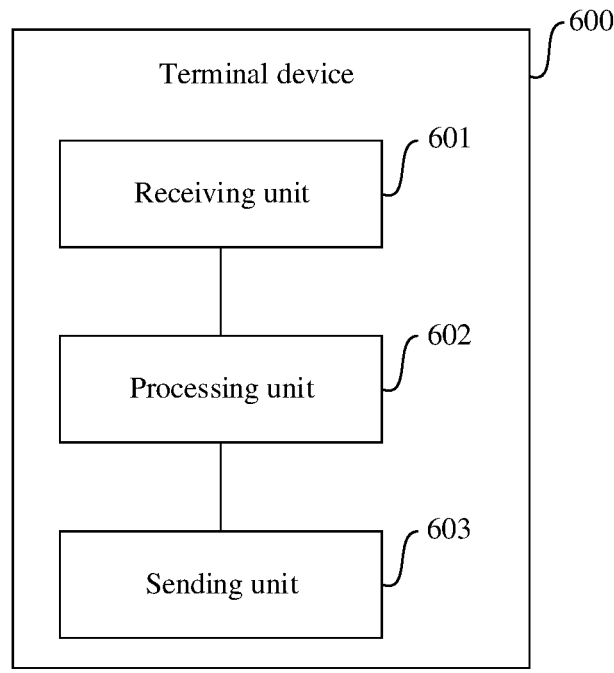
FIG. 6 is a schematic structural diagram of a terminal device according to another embodiment of this application.

FIG. 6 is a schematic structural diagram of a terminal device according to another embodiment of this application. In a case that each functional module is divided corresponding to each function, FIG. 6 illustrates a possible schematic composition diagram of a terminal device 600 involved in this embodiment. As shown in FIG. 6, the terminal device 600 may include: a receiving unit 601, a processing unit 602, and a sending unit 603.

The receiving unit 601 may be configured to support the terminal device 600 to perform step 502, and/or for other processes of the technical solutions described in the embodiments of this application.

The processing unit 602 may be configured to support the terminal device to 600 perform step 501 to step 502, and/or for other processes of the technical solutions described in the embodiments of this application.

It should be noted that the related content of the steps related to the foregoing method embodiments may be quoted to the functional description of the corresponding functional modules, and details will not be repeated herein.

The terminal device 600 provided in this embodiment is configured to perform the data download method, and therefore may achieve the same effect as the foregoing method.

It may be understood that the terminal device 600 may correspond to the terminal device 100 in FIG. 1. Functions of the receiving unit 601 and the sending unit 603 may be implemented by the processor 110, the antenna 2, and the wireless communication module 160 in the terminal device 100 shown in FIG. 1; and functions of the processing unit 602 may be implemented by the processor 110 in the terminal device 100 shown in FIG. 1.

During use of an integrated unit, the terminal device 600 may include a processing module, a storage module, and a communication module.

The processing module may be configured to control and manage an action of the terminal device 600, for example, may be configured to support the terminal device 600 to perform the steps to be performed by the receiving unit 601, the processing unit 602, and the sending unit 603. The storage module may be configured to support the terminal device 600 store program code and data, or the like. The communication module may be configured to support the communication between the terminal device 600 and another device.

The processing module may be a processor or a controller, which can implement or execute various exemplary logical blocks, modules, and circuits described in combination with the disclosure of this application. The processor may also be a combination for implementing computing functions, for example, a combination of one or more microprocessors, a combination of digital signal processing (digital signal processing, DSP) and microprocessors, or the like. The storage module may be a memory. The communication module may be a device, such as a radio frequency circuit, a Bluetooth chip, and/or a WiFi chip, that interacts with another electronic device.

In an embodiment, in a case that the processing module is a processor and the storage module is a memory, the terminal device 600 involved in this embodiment may be a device having the structure shown in FIG. 1. An embodiment of this application further provides a computer-readable storage medium. The computer-readable storage medium stores a computer program, and the computer program, when run on a computer, causes the computer to perform the method provided in the embodiments shown in FIG. 3 to FIG. 5.

An embodiment of this application further provides a computer program product. The computer program product includes a computer program, and the computer program, when run on a computer, causes the computer to perform the method provided in the embodiments shown in FIG. 3 to FIG. 5.

In this embodiment of this application, "at least one" means one or more, and "a plurality of" means two or more. "And/or" describes an association relationship for describing associated objects and represents that three relationships may exist. For example, A and/or B may represent the following three cases: only A exists, both A and B exist, and only B exists. A and B may be singular or plural. The character "/" generally indicates an "or" relationship between the associated objects. "At least one of the following items" or a similar expression means any combination of these items, including a single item or any combination of a plurality of items. For example, at least one of a, b, or c may represent a, b, c, "a and b", "a and c", "b and c", or "a, b, and c", where a, b, and c may be singular or plural.

A person of ordinary skill in the art may be aware that the units and algorithm steps described in the embodiments disclosed herein can be implemented by a combination of electronic hardware, computer software, and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the scope of this application.

A person skilled in the art can clearly understand that for convenience and conciseness of description, for specific working processes of the foregoing described system, apparatus and unit, reference can be made to the corresponding processes in the foregoing method embodiments, and details are not described herein.

In several embodiments provided in this application, when any function is implemented in the form of a software functional unit and sold or used as an independent product, the functions may be stored in a computer readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device, and the like) to perform all or a part of the steps of the method described in this embodiment of this application. The foregoing storage medium includes: any medium that can store program code, such as a USB flash drive, a removable hard disk, a ROM (read only memory, ROM), a RAM (random access memory, RAM), a magnetic disk, or an optical disc.

The foregoing descriptions are merely specific implementations of this application. Any variation or replacement readily figured out by a person skilled in the art within the technical scope disclosed in this application shall fall within the protection scope of this application. The protection scope of this application shall be subject to the protection scope of the claims.

What is claimed is:

1. A method, applied to a terminal device, the method comprising:
    detecting, by the terminal device, that a data stream from a network side is download traffic, wherein the terminal device accesses a first wireless fidelity (WiFi) network through a first WiFi network interface and accesses a second WiFi network through a second WiFi network interface;
    obtaining, by the terminal device, a dual WiFi capability supported by the terminal device;
    in a case that the dual WiFi capability supported by the terminal device is a simultaneous dual band dual band dual concurrent capability (SDB DBDC) capability, receiving, by the terminal device, first download traffic through the first WiFi network and the second WiFi network simultaneously;
    in a case that the dual WiFi capability supported by the terminal device is a real simultaneous dual band dual band dual concurrent capability (RSDB DBDC) capability, receiving, by the terminal device, second download traffic through the first WiFi network; and
    during a process of receiving the second download traffic through the first WiFi network, when it is detected that a download bandwidth currently used by the first WiFi network is less than a threshold, receiving, by the terminal device, the second download traffic through the first WiFi network and the second WiFi network simultaneously; and
    wherein:
        when the dual WiFi capability supported by the terminal device is the SDB DBDC capability, the first WiFi network and the second WiFi network operate independently and the first WiFi network and the second WiFi network operate on different frequency bands respectively; and
        when the dual WiFi capability supported by the terminal device is the RSDB DBDC capability, the first WiFi network and the second WiFi network operate on two frequency bands simultaneously and a sum of a download bandwidth used by the first WiFi network and a download bandwidth used by the second WiFi network is less than or equal to maximum bandwidth of a WiFi network corresponding to the RSDB DBDC capability.

2. The method according to claim 1, wherein receiving the first download traffic through the first WiFi network and the second WiFi network comprises:
    establishing, by the terminal device, a first network path between the first WiFi network interface and the network side, and establishing a second network path between the second WiFi network interface and the network side;
    sounding, by the terminal device, the first network path through the first WiFi network, to determine a path quality of the first network path, and sounding the second network path through the second WiFi network, to determine a path quality of the second network path; and
    in a case that the path qualities of the first network path and the second network path are higher than a predetermined first path quality threshold, receiving, by the terminal device, the first download traffic through the first network path and the second network path simultaneously.

3. The method according to claim 1, wherein before receiving the second download traffic through the first WiFi network, the method further comprises:
    establishing, by the terminal device, a first network path between the first WiFi network interface and the network side; and
    sounding, by the terminal device, the first network path through the first WiFi network, to determine a path quality of the first network path; and
    wherein receiving the second download traffic through the first WiFi network comprises:
        in a case that the path quality of the first network path is higher than a predetermined first path quality threshold, receiving, by the terminal device, the second download traffic through the first network path.

4. The method according to claim 3, wherein after receiving the second download traffic through the first WiFi network, the method further comprises:
- measuring, by the terminal device, a download bandwidth currently used by the first WiFi network;
- in a case that the download bandwidth currently used by the first WiFi network is less than a maximum bandwidth of a WiFi network corresponding to the RSDB DBDC capability, establishing, by the terminal device, a second network path between the second WiFi network interface and the network side; and
- sounding, by the terminal device, the second network path through the second WiFi network, to determine a path quality of the second network path; and
- wherein receiving the second download traffic through the first WiFi network and the second WiFi network comprises:
  - in a case that the path quality of the second network path is higher than a predetermined first path quality threshold, receiving, by the terminal device, the second download traffic through the first network path and the second network path simultaneously.

5. The method according to claim 4, wherein after receiving the first download traffic through the first WiFi network and the second WiFi network, or after the receiving the second download traffic through the first WiFi network and the second WiFi network, the method further comprises:
- sounding the path qualities of the first network path and the second network path; and
- disabling a network path, in the first network path and the second network path, whose path quality is lower than a predetermined second path quality threshold.

6. The method according to claim 1, wherein during the process of receiving the second download traffic through the first WiFi network, the method further comprises:
- when it is detected that the download bandwidth currently used by the first WiFi network is greater than or equal to the threshold, continuing to receive the second download traffic through the first WiFi network.

7. The method according to claim 1, wherein obtaining the dual WiFi capability supported by the terminal device comprises:
- determining, by the terminal device, that the dual WiFi capability supported by the terminal device is the SDB DBDC capability or the RSDB DBDC capability, according to one or more of a model or a device identification of the terminal device, or a model of a WiFi chip in the terminal device.

8. The method according to claim 1, wherein the first WiFi network is a primary WiFi network of the terminal device, and the second WiFi network is a secondary WiFi network of the terminal device.

9. A terminal device, comprising:
- one or more processors;
- a non-transitory memory storing a plurality of applications and one or more computer programs, wherein the one or more computer programs comprise instructions, and the instructions, when executed by the terminal device, cause the terminal device to perform the following steps:
  - detecting that a data stream from a network side is download traffic, wherein the terminal device accesses a first wireless fidelity (WiFi) network through a first WiFi network interface and accesses a second WiFi network through a second WiFi network interface;
  - obtaining a dual WiFi capability supported by the terminal device;
  - in a case that the dual WiFi capability supported by the terminal device is a simultaneous dual band dual band dual concurrent capability (SDB DBDC) capability, receiving first download traffic through the first WiFi network and the second WiFi network simultaneously;
  - in a case that the dual WiFi capability supported by the terminal device is a real simultaneous dual band dual band dual concurrent capability (RSDB DBDC) capability, receiving second download traffic through the first WiFi network; and
  - during a process or receiving the second download traffic through the first WiFi network, when it is detected that a download bandwidth currently used by the first WiFi network is less than a threshold, receiving the second download traffic through the first WiFi network and the second WiFi network simultaneously; and
- wherein:
  - when the dual WiFi capability supported by the terminal device is the SDB DBDC capability, the first WiFi network and the second WiFi network operate independently and the first WiFi network and the second WiFi network operate on different frequency bands respectively; and
  - when the dual WiFi capability supported by the terminal device is the RSDB DBDC capability, the first WiFi network and the second WiFi network operate on two frequency bands simultaneously and a sum of a download bandwidth used by the first WiFi network and a download bandwidth used by the second WiFi network is less than or equal to a maximum bandwidth of a WiFi network corresponding to the RSDB DBDC capability.

10. The terminal device according to claim 9, wherein receiving the first download traffic through the first WiFi network and the second WiFi network comprises:
- establishing a first network path between the first WiFi network interface and the network side, and establishing a second network path between the second WiFi network interface and the network side;
- sounding the first network path through the first WiFi network, to determine a path quality of the first network path, and sounding the second network path through the second WiFi network, to determine a path quality of the second network path; and
- in a case that the path qualities of the first network path and the second network path are higher than a predetermined first path quality threshold, receiving the first download traffic through the first network path and the second network path simultaneously.

11. The terminal device according to claim 9, wherein the instructions, when executed by the terminal device, further cause the terminal device to perform the following steps:
- before receiving the second download traffic through the first WiFi network, establishing a first network path between the first WiFi network interface and the network side;
- sounding the first network path through the first WiFi network, to determine a path quality of the first network path; and
- wherein receiving the second download traffic through the first WiFi network comprises:
  - in a case that the path quality of the first network path is higher than a predetermined first path quality threshold, receiving the second download traffic through the first network path.

12. The terminal device according to claim 11, wherein the instructions, when executed by the terminal device, further cause the terminal device to perform the following steps:
after receiving the second download traffic through the first WiFi network, measuring a download bandwidth currently used by the first WiFi network;
in a case that the download bandwidth currently used by the first WiFi network is less than a maximum bandwidth of a WiFi network corresponding to the RSDB DBDC capability, establishing a second network path between the second WiFi network interface and the network side; and
sounding the second network path through the second WiFi network, to determine a path quality of the second network path; and
wherein receiving the second download traffic through the first WiFi network and the second WiFi network comprises:
in a case that the path quality of the second network path is higher than a predetermined first path quality threshold, receiving the second download traffic through the first network path and the second network path simultaneously.

13. The terminal device according to claim 12, wherein the instructions, when executed by the terminal device, further cause the terminal device to perform the following steps:
after receiving the first download traffic through the first WiFi network and the second WiFi network, or, after receiving the second download traffic through the first WiFi network and the second WiFi network, sounding the path qualities of the first network path and the second network path; and
disabling a network path, in the first network path and the second network path, whose path quality is lower than a predetermined second path quality threshold.

14. The terminal device according to claim 9, wherein the instructions, when executed by the terminal device, further cause the terminal device to perform the following steps:
during the process of receiving the second download traffic through the first WiFi network, when it is detected that the download bandwidth currently used by the first WiFi network is greater than or equal to the threshold, continuing to receive the second download traffic through the first WiFi network.

15. The terminal device according to claim 9, wherein obtaining the dual WiFi capability supported by the terminal device comprises:
determining that the dual WiFi capability supported by the terminal device is the SDB DBDC capability or the RSDB DBDC capability, according to one or more of a model or a device identification of the terminal device, or a model of a WiFi chip in the terminal device.

16. The terminal device according to claim 9, wherein the first WiFi network is a primary WiFi network of the terminal device, and the second WiFi network is a secondary WiFi network of the terminal device.

17. A non-transitory computer-readable storage medium, wherein the non-transitory computer-readable storage medium stores a computer program, and the computer program, when run on a terminal device, causes the terminal device to perform the following steps:

detecting that a data stream from a network side is download traffic;
obtaining a dual WiFi capability supported by the terminal device;
in a case that the dual WiFi capability supported by the terminal device is a simultaneous dual band dual band dual concurrent capability (SDB DBDC) capability, receiving a first download traffic through a first WiFi network and a second WiFi network simultaneously;
in a case that the dual WiFi capability supported by the terminal device is a real simultaneous dual band dual band dual concurrent capability (RSDB DBDC) capability, receiving a second download traffic through the first WiFi network; and
during a process of receiving the second download traffic through the first WiFi network, when it is detected that a download bandwidth currently used by the first WiFi network is less than a threshold, receiving the second download traffic through the first WiFi network and the second WiFi network simultaneously; and
wherein:
when the dual WiFi capability supported by the terminal device is the SDB DBDC capability, the first WiFi network and the second WiFi network operate independently and the first WiFi network and the second WiFi network operate on different frequency bands respectively; and
when the dual WiFi capability supported by the terminal device is the RSDB DBDC capability, the first WiFi network and the second WiFi network operate on two frequency bands simultaneously and a sum of a download bandwidth used by the first WiFi network and a download bandwidth used by the second WiFi network is less than or equal to a maximum bandwidth of a WiFi network corresponding to the RSDB DBDC capability.

18. The non-transitory computer-readable storage medium according to claim 17, wherein receiving the first download traffic through the first WiFi network and the second WiFi network comprises:
establishing a first network path between the first WiFi network interface and the network side, and establishing a second network path between the second WiFi network interface and the network side;
sounding the first network path through the first WiFi network, to determine a path quality of the first network path, and sounding the second network path through the second WiFi network, to determine a path quality of the second network path; and
in a case that the path qualities of the first network path and the second network path are higher than a predetermined first path quality threshold, receiving the first download traffic through the first network path and the second network path simultaneously.

19. The non-transitory computer-readable storage medium according to claim 17, wherein the computer program, when run on the terminal device, causes the terminal device to perform the following further steps:
before receiving the second download traffic through the first WiFi network, establishing a first network path between the first WiFi network interface and the network side; and
sounding the first network path through the first WiFi network, to determine a path quality of the first network path; and
wherein receiving the second download traffic through the first WiFi network comprises:

in a case that the path quality of the first network path is higher than a predetermined first path quality threshold, receiving the second download traffic through the first network path.

20. The non-transitory computer-readable storage medium according to claim 19, wherein the computer program, when run on the terminal device, causes the terminal device to perform the following further steps:
- after receiving the second download traffic through the first WiFi network, measuring a download bandwidth currently used by the first WiFi network;
- in a case that the download bandwidth currently used by the first WiFi network is less than a maximum bandwidth of a WiFi network corresponding to the RSDB DBDC capability, establishing a second network path between the second WiFi network interface and the network side; and
- sounding the second network path through the second WiFi network, to determine a path quality of the second network path; and
- wherein receiving the second download traffic through the first WiFi network and the second WiFi network comprises:
  - in a case that the path quality of the second network path is higher than a predetermined first path quality threshold, receiving the second download traffic through the first network path and the second network path simultaneously.

* * * * *